(12) United States Patent
Willems et al.

(10) Patent No.: US 8,510,142 B2
(45) Date of Patent: Aug. 13, 2013

(54) CONFLICTING EXPERT SYSTEMS

(75) Inventors: Ivo Willems, Houston, TX (US); Michael Pye, Anderson, SC (US)

(73) Assignee: Fluor Technologies Corporation, Aliso Viejo, CA (US)

( * ) Notice: Subject to any disclaimer, the term of this patent is extended or adjusted under 35 U.S.C. 154(b) by 27 days.

(21) Appl. No.: 13/186,919

(22) Filed: Jul. 20, 2011

(65) Prior Publication Data
US 2013/0024235 A1   Jan. 24, 2013

(51) Int. Cl.
*G06Q 40/00*   (2012.01)

(52) U.S. Cl.
USPC ............................. 705/7.11; 705/7.42

(58) Field of Classification Search
USPC ................................ 705/7.11, 7.42
See application file for complete search history.

(56) References Cited

U.S. PATENT DOCUMENTS

| | | | |
|---|---|---|---|
| 5,189,606 A | 2/1993 | Burns et al. | |
| 5,761,674 A | 6/1998 | Ito | |
| 5,764,953 A | 6/1998 | Collins et al. | |
| 6,856,984 B2 * | 2/2005 | Slaikeu | 706/60 |
| 7,343,295 B2 * | 3/2008 | Pomerance | 705/309 |
| 7,356,516 B2 * | 4/2008 | Richey et al. | 705/80 |
| 7,565,642 B2 | 7/2009 | Moore et al. | |
| 7,630,903 B1 * | 12/2009 | Vaidyanathan et al. | 705/1.1 |
| 7,747,567 B2 * | 6/2010 | Teegan et al. | 707/610 |
| 7,783,503 B2 | 8/2010 | Janas, II et al. | |
| 2003/0110059 A1 | 6/2003 | Janas, III et al. | |
| 2004/0073410 A1 | 4/2004 | Maly et al. | |
| 2005/0038636 A1 * | 2/2005 | Wakelam et al. | 703/1 |
| 2005/0177617 A1 * | 8/2005 | Banginwar et al. | 709/203 |
| 2006/0020359 A1 * | 1/2006 | Wu | 700/104 |
| 2006/0026009 A1 | 2/2006 | Luhr | |
| 2006/0185275 A1 | 8/2006 | Yatt | |
| 2006/0277007 A1 * | 12/2006 | Wakelam et al. | 703/1 |
| 2007/0198231 A1 | 8/2007 | Walch | |
| 2007/0282765 A1 | 12/2007 | Visel et al. | |
| 2011/0015937 A1 | 1/2011 | Janas, III et al. | |

FOREIGN PATENT DOCUMENTS

| | | |
|---|---|---|
| EP | 0469756 | 1/1998 |
| GB | 2217068 | 10/1992 |

\* cited by examiner

*Primary Examiner* — Thomas Dixon
*Assistant Examiner* — Benjamin S Fields
(74) *Attorney, Agent, or Firm* — Fish & Associates, PC

(57) ABSTRACT

An expert system for providing optimized recommendations regarding a construction project is configured to generate conflicting optimization recommendations. Multiple expert system engines are implemented, where each engine provides one or more recommendations optimized in accordance with the priorities of a functional discipline. A conflict engine will identify conflicts between optimized recommendations and will package the conflicts into conflict objects that are presented to a conflict user interface for resolution. The user could resolve the conflicts him/herself, or could configure a cross-functional conflict object to resolve such conflicts based upon specified resolution criteria.

19 Claims, 3 Drawing Sheets

CONFLICTING EXPERT SYSTEMS

FIELD OF THE INVENTION

The field of the invention is schedule optimization systems and methods.

BACKGROUND

Estimating the costs for projects can be very time-consuming and difficult. For example, when estimating costs for a construction project, costs for materials, supplies, and manpower can be difficult to obtain. Computer systems and modules could be used to gather data on costs of every known material used in such projects to create estimates based upon the costs of construction materials and manpower. Such costs, however, vary depending on the location of where such materials are being purchased.

U.S. Pat. No. 5,189,606 to Burns teaches a system and method that collects costs of materials around the world, so that a user could accurately estimate the total cost of a construction project depending upon where the project is being built and where the materials are being purchased. Burns, however, only provides a single estimate for construction projects, which does not allow a user to estimate the highest and lowest possible cost for a project.

U.S. Pat. No. 5,764,953 to Collins teaches a system and method for making a decision by creating a domain model, and then by modifying that domain model based upon real-time changes. As the real-time variables change over time, Collins allows a user to see how a cost estimate for a project could vary. Collins, however, only follows a single domain model throughout the simulated decision-making process, and does not allow for a plurality of domain model choices, some of which could handle a broader swing of variable change over time.

U.S. Pat. No. 5,761,674 to Ito teaches a system with a plurality of expert systems, each of which estimates a separate part of a given project to increase the accuracy and granularity of a project plan. Since Ito's system uses independent expert systems to create different project plans, Ito's system could conceivably create conflicting plans that are not compatible with one another.

U.S. Pat. No. 6,856,984 to Slaikea and U.S. Pat. No. 7,565,642 to Moore both teach systems that takes into account different domain models that conflict with one another, and applies that could be used to optimally handle such conflicts. Slaikea and Moore, however, both resolve all such conflicts automatically by applying known rules, and fails to find conflicts between different optimization algorithms and present such conflicts to a human user for resolution. Presenting such conflicts to a human user for resolution is frequently far more helpful than using automated rules, since human users can enact policy decisions that optimize a solution in ways that a computer is not equipped to handle.

These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

What has yet to be appreciated is that it would be desirable to have an automated system capable of generating and identifying conflicts. For example, two expert systems reflecting expertise of subject matter experts can provide recommendations for two different areas of a construction project. Each expert system might focus on different areas of optimization (e.g., cost versus materials, materials versus lead time, etc.). Therefore, the recommendations could be in conflict because an optimization according to one metric might cause an adverse affect in another metric. Project planners would benefit from identifying such conflicts and resolving them quickly before undue costs are incurred.

Thus, there is still a need for improved expert systems that can optimize the costs for a plurality of possible scenarios by creating conflicts for a human user to resolve.

SUMMARY OF THE INVENTION

It should be noted that while the following description is drawn to computers/servers that create optimized recommendation plans and present conflicts between such plans, various alternative configurations are also deemed suitable and may employ various computing devices including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

One should appreciate that the conflict engine seeks out conflicts between two optimized recommendations to present to a user or to a cross-functional expert system. All prior art conflict engines are designed to avoid such conflicts by resolving them based upon an optimization algorithm.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

The inventive subject matter provides apparatus, systems and methods in which a capital project system has two or more expert system engines that each create recommendations which conflict with one another, allowing a human user to examine the conflicts and derive an optimized recommendation based upon rules that have not, and likely could not have, been entered into the expert system engines. Exemplary capital projects include construction projects, long-term equipment purchases, and long-term maintenance/rehabilitation projects. Each expert system preferably represents a different functional discipline that optimizes each recommendation based upon that functional discipline's preference rules. Contemplated functional disciplines could include a plurality of phases for a given project, for example, a pre-conceptual phase, a conceptual phase, a design phase, an engineering phase, a construction phase, an operation phase, a maintenance phase, and an end-of-life phase. Other contemplated functional disciplines could include specialized divisions or sub-organizations within a corporation, for example marketing, engineering, architectural systems, construction management, civil engineering management, structural engineering management, contracts, electrical, material management, mechanical management, pipeline management, quality assurance, a client, a supplier, a contractor, a licensor, a supporting office, or a home office.

Each functional discipline preferably has a set of rules that allow the system to create at least one optimized recommendation for that discipline. In a preferred embodiment, the functional discipline has different sets of rules for different optimization parameters. For example, one set of rules could be applied to create an optimized recommendation for performing the conception phase in the quickest time possible, another set of rules could be applied to create an optimized recommendation for performing the conception phase as cheaply as possible, and another set of rules could be applied to create an optimized recommendation for performing the conception phase as quickly as possible given a maximum threshold budget.

When each expert system creates a recommendation, a recommendation from one phase could conflict with a recommendation from another phase. For example, an engineering phase recommendation to allocate specific employees towards designing a module could conflict with a construction phase recommendation to allocate those same employees towards building a known module. Each recommendation preferably provides a predicted impact on one or more project metrics, allowing a user viewing the conflict to determine which aspects of the project will benefit and which aspects of the project will suffer depending on which recommendation is ultimately chosen.

Once an expert system creates a recommendation, a conflict engine preferably analyzes one or more recommendations made by each conflict system, and identifies conflicts between the recommendations. Such identified conflicts are preferably made based upon predicted impacts of the project metrics. As used herein, a "metric" is a measurable variable for a given recommendation that affects the resources for a project, for example the amount of time it takes to accomplish a task, the time period a task could be performed, or the amount of money a task costs to perform. The conflict engine could preferably find and locate both direct and indirect conflicts, where direct conflicts include two recommendations that require an action to be performed upon the same metric, and indirect conflicts include recommendations for actions to be performed upon different metrics which cause supplemental actions to be operated upon the same metric. For example, a direct conflict could be identified where a first recommendation requires a structural support to be built and a second recommendation requires a container to be built, but only one team is qualified to build either the structural support or the container. Or a direct conflict could be identified where a first recommendation requires a delivery of materials to be performed slowly over a six-month period of time, but a second recommendation requires the delivery to be performed quickly within a four-month period of time. While prior art conflict engines may resolve these conflicts on their own, the inventive conflict engine looks for such conflicts to present to a human user.

The conflict engine could also identify conflicts based upon a metric impact instead of a metric use. For example, a metric could be the number of hours a construction employee is allocated to a recommended action. In such a situation, a first recommendation could require that employee to work 4 hours on a Monday whereas a second recommendation could require that employee to work 6 hours on that Monday. If that employee can only work a maximum of 8 hours in a day, these two recommendations could be an identified conflict to be resolved by the system.

In a preferred embodiment, the system could have one or more defined opposition criteria for predicted impacts that it searches for when looking for conflicts between recommendations. As used herein, an "opposition criteria" is a defined criteria for optimized metrics that oppose on another. For example, the system could search for conflicts that use the same physical resource, use the same employee resource, or use the same physical location resource. In another example, the system could search for a conflict difference greater than a threshold number of hours, or a threshold difference in cost estimates. Each opposition criteria could comprise a different project-specific requirement unique to a project.

Once the conflict engine identifies one or more conflicts between the optimization recommendations, the conflict engine generally converts each conflict into a conflict object, and presents that conflict object to a user via a conflict interface. Preferably, each conflict object includes a predicted impact of project metrics, for example how much the conflict might cost if not resolved until later, how much it would cost to resolve the conflict by purchasing a greater metric capacity (such as more employees or additional pipeline), or how much the conflict might delay a recommended action. In a preferred embodiment, the conflict engine could suggest resolutions to the users based upon a rule or upon comparison of the current conflict with a well-known scenario, for example a past selection made by the user or the user's predecessor.

Each conflict object is preferably identified with metadata that describes the conflict to a user in a variety of ways, which allows a user to organize conflict objects or search for conflict objects in a variety of ways. In one embodiment, each conflict object could be identified by project metrics commonly shared with conflicting recommendations from expert systems. For example the conflict objects could be identified by a common construction machine that multiple functional disciplines may commonly access, or could be identified by a team of employees that are generally assigned to multiple disciplines during a project life.

In another embodiment, the conflict engine presents its conflicts to a cross-functional expert system, which could then optimize the conflicting recommendations based upon a set of rules to optimize cross-functional conflicts. Such a cross-functional expert system could be configured to recommend a resolution action based upon a project-specific resolution criteria designated by a user. For example, a user could set a cross-functional expert system to optimize cross-functional conflicts by minimizing dollar value costs, by minimizing time costs, or by minimizing time costs given a maximal dollar value cost threshold. Or a user could set a cross-functional expert system to optimize cross-functional conflicts in accordance with well-known scenarios. In an alternative embodiment, the cross-functional expert system could merely suggest optimized recommendations with a list of predicted impacts, allowing a human user to make a final determination as to whether a cross-functional expert system recommendation is implemented. Such suggestions could be similar to suggestions made by each expert system, but where the engine system might optimize a recommendation based upon rules to optimize a local system associated with a single functional discipline, the suggestions made by the cross-functional expert system would likely optimize a recommendation based upon rules to optimize the global system.

Each conflict object is preferably stored in a database according to a project and/or tool agnostic format, for example according to an XML format based on a defined schema, allowing a single cross-functional expert system or a single conflict interface to be able to pull conflicts from a variety of different projects, operating systems, or databases without issue. Such project agnostic conflict objects could be categorized by project-type in a namespace or another suitable organizational format. Each conflict object could be converted into, or originally stored as, a conflict object in a project-specific format in an alternative embodiment.

Various objects, features, aspects and advantages of the inventive subject matter will become more apparent from the following detailed description of preferred embodiments, along with the accompanying drawing figures in which like numerals represent like components.

DETAILED DESCRIPTION

It should be noted that while the following description is drawn to a computer/server conflict expert system, various alternative configurations are also deemed suitable and may employ various computing devices including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

One should appreciate that the disclosed techniques provide many advantageous technical effects including the ability to create different optimization recommendations, each with a different priority to be accomplished, and allow automated or human choices of such recommendations to sacrifice one priority for another.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Figure 1:
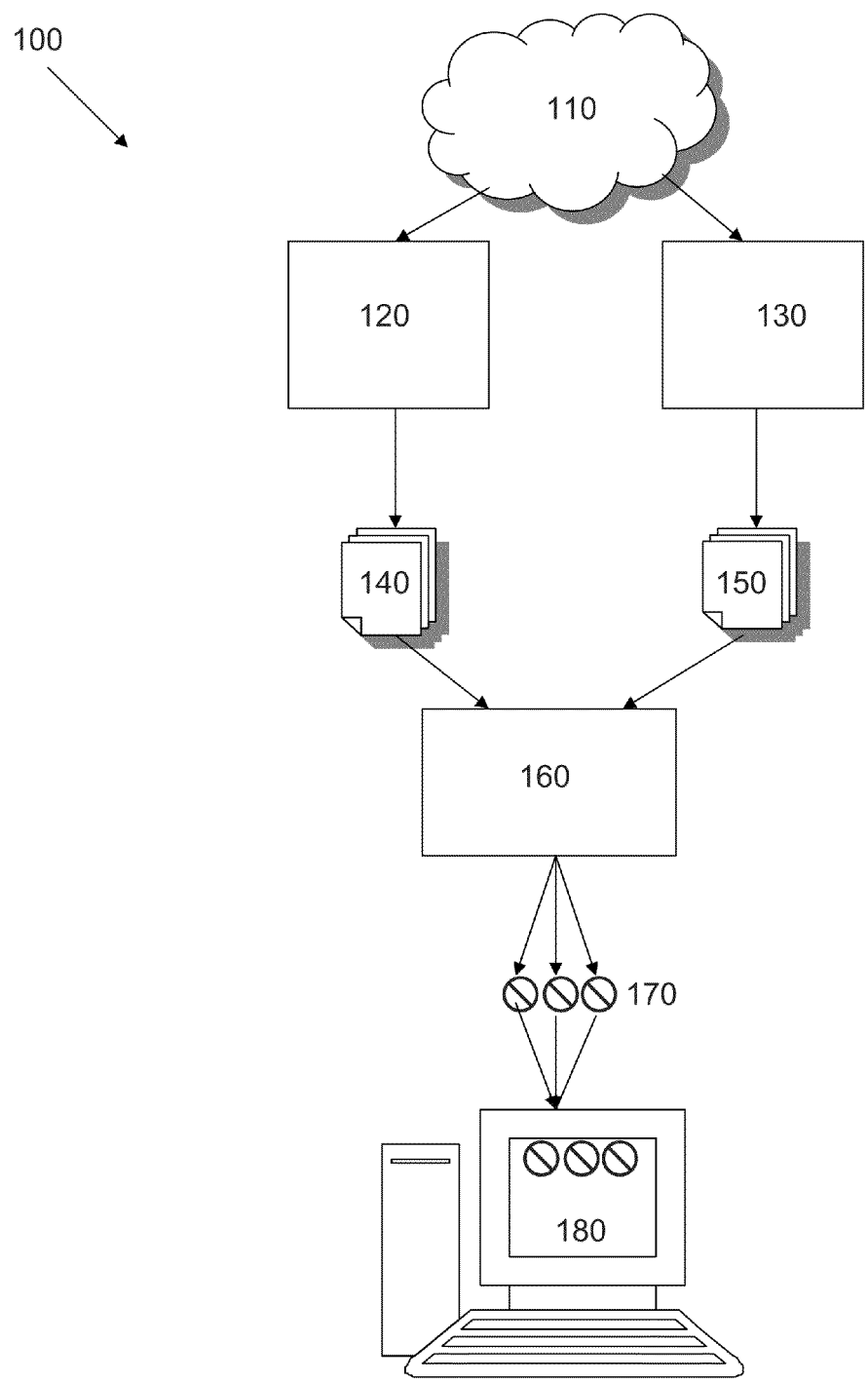
FIG. 1 is a schematic of a conflict expert system of the present invention.

In FIG. 1, an exemplary conflict resolution system 100 has raw project parameters 110, expert system engine 120, expert system engine 130, optimized recommendation 140, optimized recommendation 150, conflict engine 160, conflict objects 170, and conflict interface 180. Generally, two different expert system engines 120, and 130 examine raw project parameters 110 and create optimized recommendations 140, and 150, respectively. Each expert system engine 120 and 130 represents different functional disciplines of a given project, for example different phases or different sub-organizations within a company, and each creates optimized recommendations 140 and 150, respectively, for their respective functional discipline. While FIG. 1 shows each expert system engine 120 and 130 producing only a single optimized recommendation for each of the functional disciplines, it is contemplated that an expert system could produce a plurality of optimized recommendations.

Once optimized recommendations 140 and 150 are produced, conflict engine 160 analyzes each recommendation and actively searches for, and identifies direct and indirect conflicts. Preferably, conflict engine 160 identifies each conflict based upon the predicted impacts of project metrics resulting from the optimization recommendations. Once conflicts are identified, conflict engine 160 packages each conflict as a conflict object 170 and presents them to conflict interface 180, represented euphemistically as a network computer system with a monitor displaying three conflict objects. Each conflict could be presented along with a list of conflict-resolving recommendations made by conflict engine 160. A user (not shown) using conflict interface 180 could then use the engine to analyze the various conflicts and could then choose how to resolve conflicts based upon recommendations made by the conflict interface, or possibly based upon his or her own analysis of the pros and cons of each conflict. Preferably, each conflict object could be identified in conflict interface 180 by project metrics or by predicted impacts of such conflicts that satisfy a given opposition criteria.

After a user resolves all conflicts, an end-of-life process could be performed whereupon the user enters into the system information on how the actual impacts of the conflicts coincided, or differed with, the predicted impacts of the conflicts. If an actual impact differs by a predicted impact, the expert system could correct its internal prediction algorithms to improve the accuracy at which it predicts impacts based upon perceived conflicts. With such a feedback system, each expert system and cross functional expert system could be improved over time to predict impacts with greater accuracy.

Figure 2:
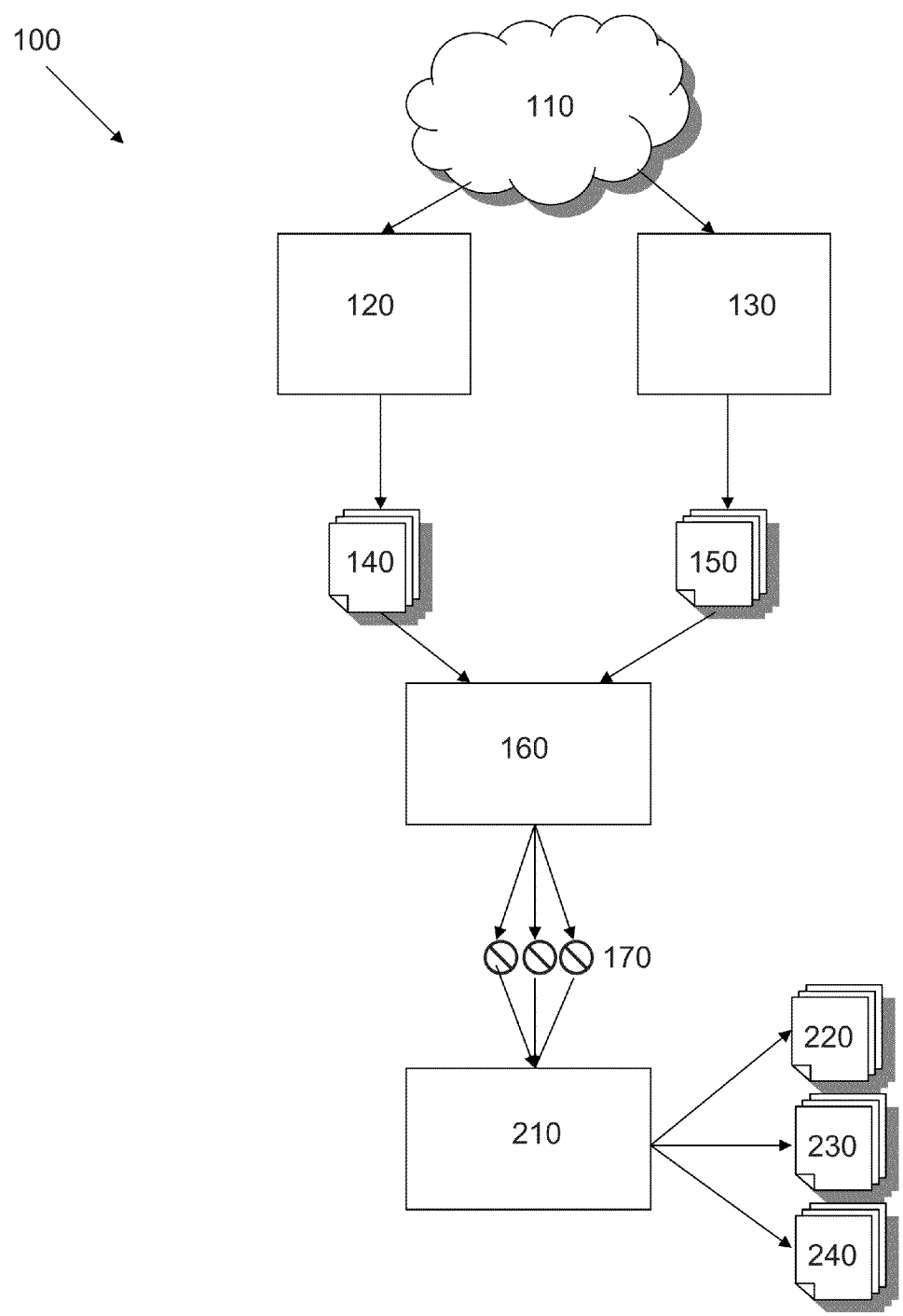
FIG. 2 is a schematic of an alternative conflict expert system having alternative optimized recommendations.

In FIG. 2, cross functional expert system 210 analyzes the conflict objects 170 to create its own optimized recommendations 220, 230, and 240. While a plurality of optimized recommendations is shown in the drawing, contemplated cross functional expert systems may present only a single optimized recommendation, depending upon its resolution criteria. The cross functional expert system 210 may have a plurality of different resolution criteria that is specific for different sorts of projects, such a different criteria for every client of a business, or a different criteria for different sub-organizations within a business. The cross functional expert system would then recommend a certain resolution action depending upon the settings of the conflict resolution criteria. In the embodiment shown in FIG. 2, each optimized recommendation 220, 230, and 240 is produced by applying a different resolution criteria that optimize according to differentiated sets of rules.

Figure 3:
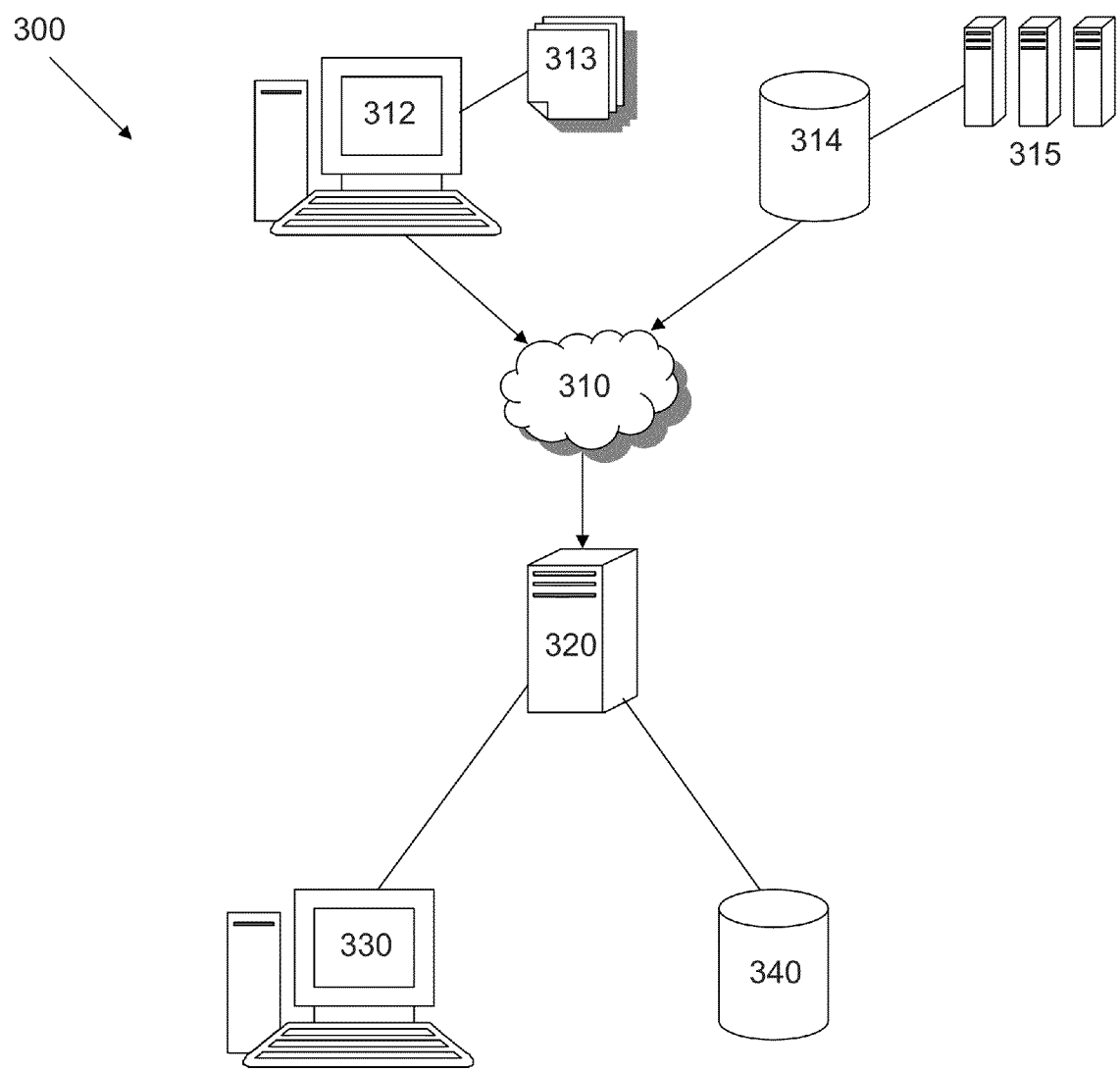
FIG. 3 is a hardware schematic of an embodiment of the conflict expert system.

In FIG. 3, an exemplary conflict expert system 300 accepts raw project parameters from one or more user interfaces 312 and one or more databases 314. User interface 312 could comprise a plurality of forms 313 filled out by various users, for example a foreman on a project who dictates the number of workers available on a project, a project manager who dictates the amount of money the corporation is willing to spend on the project, and an architect who dictates what will be built. Databases 314 could collect raw data live or from other computer systems 315 with agents that collect raw data to be used by the conflict expert system 300. Once the raw data is collected by the system, the raw data could be distributed to a plurality of conflict expert system modules running on computer system 320 via network 310.

Once the expert system modules on computer system 320 have generated conflicting optimized recommendations, the conflict engine on computer system 320 then analyzes the optimization recommendations and presents the conflict object to the user through the monitor of user interface 330. Through user interface 330, a user could analyze the predicted impact of the project metrics of one optimized recommendation against the predicted impact of the project metrics of other optimized recommendations, and could select which recommendation to move forward with. In a preferred embodiment, a user could utilize user interface 330 to create, configure, and/or modify project-specific resolution criteria used by a cross-functional expert system to auto-select a preferred optimized recommendation.

A history of presented optimized recommendations and ultimately selected optimized recommendations could be stored in database 340 for analysis by a cross-functional expert system to help that expert system develop project-specific resolution criteria based upon a selection history of a user or group of users. Such a selection history could be grouped into different scenario categories automatically according to a template or in accordance with user-defined rules. The cross-functional expert system could then be configured to only provide automatic suggestions when a sufficient history of scenarios has been compiled, such as when more than 10, 20, 30, 50, or 100 like scenarios have been archived in the database to be searched.

Computer system 320 is represented euphemistically herein as a single computer having its own processor and memory, housing expert system modules, the conflict engine module, and a cross-functional expert system module, but the various modules could be distributed among a plurality of computers using a distributed application architecture without departing from the scope of the invention.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. An expert system comprising:
   a computing device for executing a plurality of engines, the computing device comprising a processor and a non-transitory computer readable storage medium;
   at least two expert system engines configured to generate conflicting first and second optimization recommendations, wherein a first expert system engine generates the first optimization recommendation in accordance with a first functional discipline of a construction project and a second expert system generates the second optimization recommendation in accordance with a second different functional discipline of the construction project; and
   a conflict engine coupled with the at least two expert system engines and configured to:
   identify a conflict between the conflicting first and second optimization recommendations, respectively,
   convert the conflict into a conflict object including a predicted impact of project metrics, and
   present the conflict object to a user via a conflict interface.

2. The expert system of claim 1, wherein the first and second functional disciplines are selected from a group consisting of: a pre-conceptual phase, a conceptual phase, a design phase, an engineering phase, a construction phase, an operation phase, a maintenance phase, and an end-of-life phase.

3. The expert system of claim 1, wherein the conflict object comprises conflicting recommended actions from each of the first and second optimization recommendations.

4. The expert system of claim 3, further comprising a cross-functional expert system coupled with the conflict engine.

5. The expert system of claim 4, wherein the cross-functional expert system comprises project-specific resolution criteria.

6. The expert system of claim 5, wherein the cross-functional expert system is configured to recommend a resolution action selected from the conflicting recommended actions based on the project-specific resolution criteria.

7. The expert system of claim 1, wherein the conflict object is stored within a conflict database according to a project agnostic format.

8. The expert system of claim 7, wherein the conflict object comprises attributes assigned according to a common namespace.

9. The expert system of claim 7, wherein the conflict engine is further configured to compare the conflict object against well-known scenarios to recommend a resolution action according to the well-known scenarios.

10. The expert system of claim 1, wherein the conflict object is stored within a conflict database according to a tool agnostic format.

11. The expert system of claim 1, wherein the conflict object is identified via project metrics commonly shared with the conflicting optimization recommendations from the at least two expert system engines.

12. The expert system of claim 1, wherein the conflict object is identified via a predicted impact, that satisfies opposition criteria.

13. The expert system of claim 12, wherein the opposition criteria comprises project-specific requirements.

14. The expert system of claim 1, wherein the first and the second functional disciplines represent aspects of a common construction phase.

15. The expert system of claim 1, wherein the conflict engine identifies the conflict based upon a predicted impact of project metrics resulting from each of the optimization recommendations.

16. The expert system of claim 15, wherein the conflict engine receives a preferred optimization recommendation via the conflict interface and assigns a higher preference metric to a predicted impact associated with the preferred optimization recommendation.

17. The expert system of claim 15, wherein the conflict engine receives a preferred predicted impact of at least one of the optimization recommendations and assigns a higher preference metric to the preferred predicted impact.

18. The expert system of claim 16, further comprising a cross-functional expert system that utilizes the higher preference metric associated with the predicted impact to recommend a resolution action selected from a new set of conflicting recommended actions.

19. The expert system of claim 17, further comprising a cross-functional expert system that utilizes the higher preference metric associated with a predicted impact to recommend a resolution action selected from a new set of conflicting recommended actions.

* * * * *